United States Patent [19]
Fujii et al.

[11] Patent Number: 6,057,523
[45] Date of Patent: May 2, 2000

[54] METHOD OF CONTROLLING WELDING CONDITIONS OF A RESISTANCE WELDER

[75] Inventors: Koji Fujii, Osaka; Yasuhiro Goto, Kawanishi; Makoto Ryudo, Mino, all of Japan

[73] Assignee: Matsushita Electric Industrial Co., Ltd., Osaka, Japan

[21] Appl. No.: 08/935,239

[22] Filed: Sep. 22, 1997

[30] Foreign Application Priority Data

Sep. 24, 1996 [JP] Japan .................................. 8-251092

[51] Int. Cl.$^7$ ................................................... B23K 11/24
[52] U.S. Cl. ............................................................. 219/110
[58] Field of Search .................................. 219/110, 108, 219/109, 117.1

[56] References Cited

U.S. PATENT DOCUMENTS

| | | | |
|---|---|---|---|
| 4,596,917 | 6/1986 | Nied et al. | 219/109 |
| 4,861,960 | 8/1989 | Haefner et al. | 219/110 |
| 5,343,011 | 8/1994 | Fujii et al. | 219/109 |
| 5,440,092 | 8/1995 | Kawai . | |
| 5,575,934 | 11/1996 | Takakuwa et al. | 219/109 |

FOREIGN PATENT DOCUMENTS

| | | |
|---|---|---|
| 0 129 963 | 1/1985 | European Pat. Off. . |
| 0 350 013 | 1/1990 | European Pat. Off. . |
| 0 581 315 | 2/1994 | European Pat. Off. . |
| 0 780 186 | 6/1997 | European Pat. Off. . |
| 56-158286 | 12/1981 | Japan . |
| 59-14312 | 1/1984 | Japan . |
| 59-40550 | 3/1984 | Japan . |
| 59-61580 | 4/1984 | Japan . |
| 2 073 446 | 10/1981 | United Kingdom . |

OTHER PUBLICATIONS

Patent Abstracts of Japan, vol. 95, No. 10, Nov. 30, 1995, & JP 07 185835 A (Matsushita Electric Ind Co Ltd), Jul. 25, 1995.

Patent Abstracts of Japan, vol. 8, No. 166 (M–314), Aug. 2, 1984 & JP 59 061580 A (Toyota Shiyatai KK), Apr. 7, 1984.

Patent Abstracts of Japan, vol. 13, No. 527 (P–965), Nov. 24, 1989 & JP 01 216246 A (Tanaka Kikinzoku Kogyo KK Et al.), Aug. 30, 1989.

*Primary Examiner*—Clifford C. Shaw
*Attorney, Agent, or Firm*—Pearne, Gordon, McCoy & Granger LLP

[57] ABSTRACT

The invention concerns a method of controlling welding conditions of a resistance welder, in which the nugget generating state can be estimated with general-purpose properties, and in which accurate and high-quality resultant welding can be obtained. Through a process of using a heat conduction simulator for performing simulation of a welding portion on the basis of heat conduction calculation, estimating the status quantity expressing the state in which a nugget is formed in the welding portion during welding, comparing the status quantity with reference status quantity led out of a physical phenomenon generating during welding at the time of estimation, and correcting the heat conduction simulator on the basis of the comparison result, it is possible to control the welding conditions accurately, and it is possible to obtain accurate and high-quality resultant welding.

11 Claims, 5 Drawing Sheets

METHOD OF CONTROLLING WELDING CONDITIONS OF A RESISTANCE WELDER

BACKGROUND OF THE INVENTION

The present invention relates to a welding condition controller of a resistance welder used for spot welding.

Resistance welding, particularly spot welding is used for various products using steel plates, but it has a tendency of increasing welding failures recently. That is, soft steel plates have been generally used as material to be welded conventionally, so that there has been few failure in conducting, and the quality of welding has been able to be kept comparatively stable if the welding conditions are controlled to be constant. However, galvanized steel plates or high-tensile steel plates have come to be used instead of soft steel plates, so that welding failures have become more common. Accordingly, an apparatus which not only monitors the welding conditions but also controls the quality of welding accurately has been sought after.

To solve this problem, as a technique which is not a device for controlling a welder directly but which is similar thereto, various welding quality monitoring apparatuses have been developed in order to judge the quality of resultant welding after the welding is finished. If the quality of welding can be judged, the result can be reflected on the succeeding welding. For example, the following methods and so on have been developed:

1) A method in which chip-to-chip resistance is obtained from a welding current and a welding voltage, the quality of resultant welding is judged from a change pattern of the chip-to-chip resistance, for example, as disclosed in Japanese Patent Unexamined Publication No. Sho-56-158286;

2) A method in which chip-to-chip voltage is compared with a variation with time of a predetermined reference voltage, and the quality of resultant welding is judged by the fact as to whether the difference therebetween is within an allowable range, for example, as disclosed in Japanese Patent Unexamined Publication No. Sho-59-14312, and another method in which an active component effectively contributing to heat generation of a welding portion is extracted from a chip-to-chip voltage, and the quality of resultant welding is judged from a time quadrature value of the active component, for example, as disclosed in Japanese Patent Unexamined Publication No. Sho-59-40550 or No. Sho-59-61580;

3) A method in which heat generation temperature is detected, and the quality of resultant welding is judged from a temperature change pattern, for example, as disclosed in Japanese Patent Unexamined Publication No. Hei-1-216246;

4) A method in which an ultrasonic wave is made to penetrate material to be welded, and the quality of resultant welding is judged from the penetrating quantity, for example, as disclosed in Japanese Patent Unexamined Publication No. Sho-52-94841;

5) A method in which a displacement of an electrode chip during welding is used, for example, as disclosed in Japanese Patent Unexamined Publication No. Sho-60-40955;

6) A method in which a welding current is detected, and its upper and lower limit values are monitored so as to make the resultant welding constant; and 7) A method in which a heat-conduction model is used, and a nugget diameter is calculated by using a computer, for example, as disclosed in Paper by Sano, "Research on Numerical Analysis of Conducting Path and Temperature Distribution in Spot Welding", Osaka University Postgraduate Course Welding Subject Master's Thesis (1979), and Paper by Nishiu "Research on Speeding-up Monitoring of Quality for Helping Calculation of Numerical Values for Resistance Spot Welding", Osaka University Postgraduate Course Welding Subject Master's Thesis (1991).

In addition, there is a method for controlling a welder directly, as follows:

8) A method in which base material temperature distribution is calculated from a heat-conduction model, and a nugget diameter is estimated from the temperature distribution while the temperature distribution is corrected by using the quantity of movement of an electrode during welding, as disclosed in Japanese Patent Unexamined Publication no. Hei-7-16791.

Of these conventional methods, in the method 1) it is difficult to judge the quality of resultant welding because the change pattern of resistance is not uniform when crushing of the head portion of a chip or a split current is produced, or when the material to be welded is a galvanized steel. In the method 2), it is difficult to judge the quality accurately in practical use because the judgement conditions of resultant welding must be set whenever a change occurs in welding conditions such as crushing of a chip, change of thickness, and so on. The methods 3) and 4) have problems that the methods cannot be applied to working in the site with respect to installation and attachment of temperature detection means and ultrasonic wave transmitting and receiving means. The method 5) has practical problems caused by inclusion of noise, difficulty in measurement of a very small displacement, individual differences in mechanical strength of resistance welders, and so on, when the method is applied to working in the welding site. Although the method 6) can be realized at a low price and easily and is useful in detecting fault of a power supply, breaking of a secondary conductor, and so on, it is impossible to judge the quality of a welding portion deteriorated by the reduction of electric current density caused by crushing of the head portion of a chip, production of a split current, and so on.

Working to perform a preliminary experiment in the welding site upon every welding material so as to obtain the relationship between the quality of welding and the standard of judgement in advance is inevitable in these conventional welding quality monitoring apparatuses, and as the result of the judgement, it is possible merely to judge the quality of a welding portion roughly. The method 7) has a possibility to solve the foregoing problem, but has a weakest point in that it takes much time to solve an equation of heat conduction. Therefore, a measure to calculate a nugget diameter at a high speed has been developed, and an apparatus for monitoring all the welding points in the welding site after finishing welding has been put into practice.

Therefore, even if a conventional welding quality monitoring apparatus except those according to the methods 7) and 8) is used with a resistance welder, failure in quality is produced in a welding portion. Accordingly, not only adjustment has been required, but also there has been a risk that products are made waste or causes troubles in the market, as the case may be. In addition, even according to the method 7), it is after finishing welding that the resultant welding can be judged, and the output of the welder itself cannot be controlled to improve the resultant welding. Further, although the method 8) takes a step forward than the method 7), but it merely corrects the temperature distribution and does not take into consideration the existence of interface resistance between an electrode and a plate due to electrode abrasion which gives a large influence onto the estimation of temperature distribution of a welding portion. Accordingly, in the method 8), it is difficult to estimate the temperature distribution accurately.

SUMMARY OF THE INVENTION

The present invention is achieved to solve the foregoing conventional problems, and it is an object of the invention to provide a method of controlling welding conditions of a resistance welder, in which the state that a nugget is generated can be estimated with general-purpose properties, and in which an accurate and high-quality resultant welding can be obtained.

In order to attain the foregoing object, according to the present invention, a method of controlling welding conditions of a resistance welder is characterized by detecting a welding current and a chip-to-chip voltage, using a heat conduction simulator for performing simulation of a welding portion on the basis of heat conduction calculation from both the detection values, estimating the status quantity expressing a nugget-forming state during welding in the welding portion, comparing the status quantity with reference status quantity at the time of estimation, correcting the welding conditions on the basis of the result of comparison, and changing at least one of the configuration or a numerical value of the heat conduction simulator on the basis of a monitor value expressing the state of welding after welding is started.

With the above-mentioned configuration, a method of controlling welding conditions of a resistance welder according to the present invention is characterized by detecting a welding current and a chip-to-chip voltage, using a heat conduction simulator for performing simulation of a welding portion on the basis of heat conduction calculation from both the detection values, estimating the status quantity expressing a nugget-forming state during welding in the welding portion, comparing the status quantity with reference status quantity at the time of estimation, correcting the welding conditions on the basis of the result of comparison, and changing at least one of the configuration or a numerical value of the heat conduction simulator, for example, by inserting an interface resistance on the basis of a monitor value expressing the state of welding after welding is started so that a real change in the state of the welding portion caused by crushing of a welding electrode and a variation in the surface state of the material to be welded during welding can be reflected on the heat conduction simulator. Accordingly, it is possible to always perform simulation of the welding portion with a high accuracy, and it is possible to realize controlling the welding conditions of a resistance welder more accurately.

DETAILED DESCRIPTION OF THE PREFERRED EMBODIMENT

An embodiment for carrying out the method of controlling welding conditions of a resistance welder according to the present invention will be described with reference to FIGS. 1 to 7.

Figure 1:
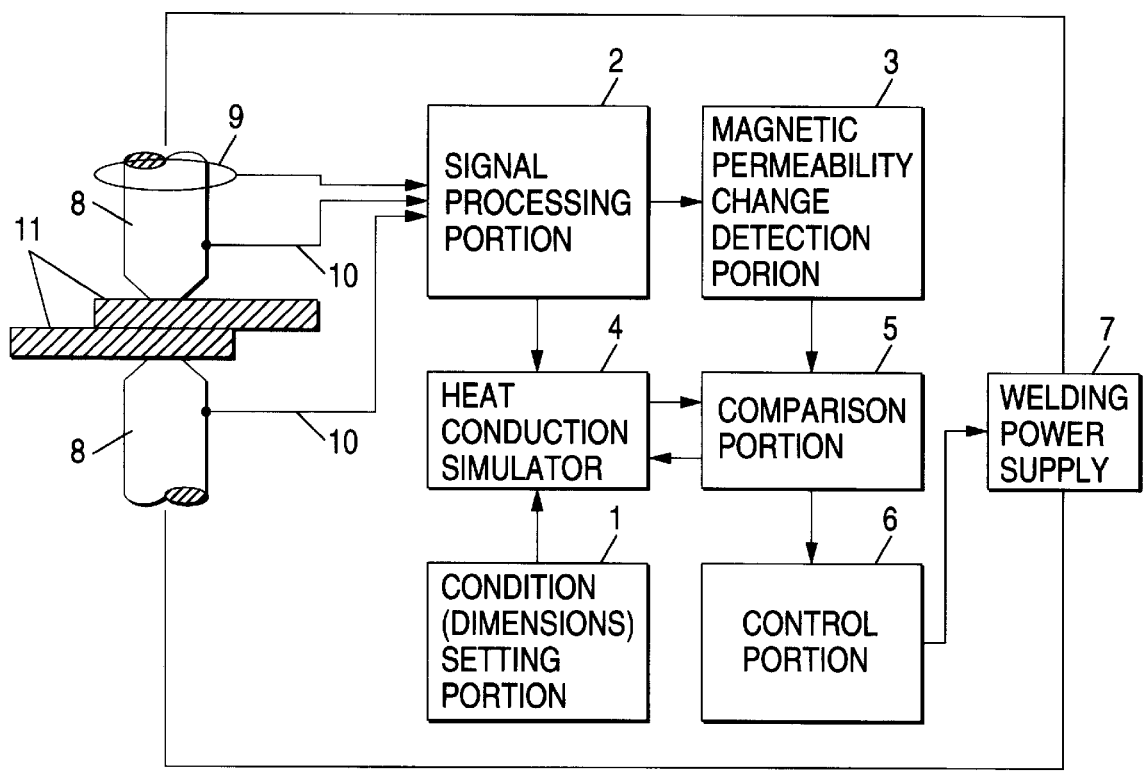
FIG. 1 is a block diagram illustrating an embodiment for carrying out a welding condition control method of a resistance welder according to the present invention.

In FIG. 1, the reference numeral 1 represents a condition setting portion for setting dimensions of a welding portion in advance; 2, a signal processing portion supplied with a welding current and a welding voltage for performing signal processing upon the values of the current and voltage; 3, a magnetic permeability change detection portion; 4, a heat conduction simulator for simulating the welding portion on the basis of heat conduction calculation; 5, a comparison portion for estimating the time when the welding portion is fused on the basis of the time when magnetic permeability is detected, and comparing the estimated value with the fusing time estimated by the heat conduction simulator 4; 6, a control portion for controlling a welding power supply; 7, a welding power supply; 8, a welding electrode; 9, a welding current detection portion; 10, a chip-to-chip voltage detection cable; and 11, a material to be welded.

Figure 2:
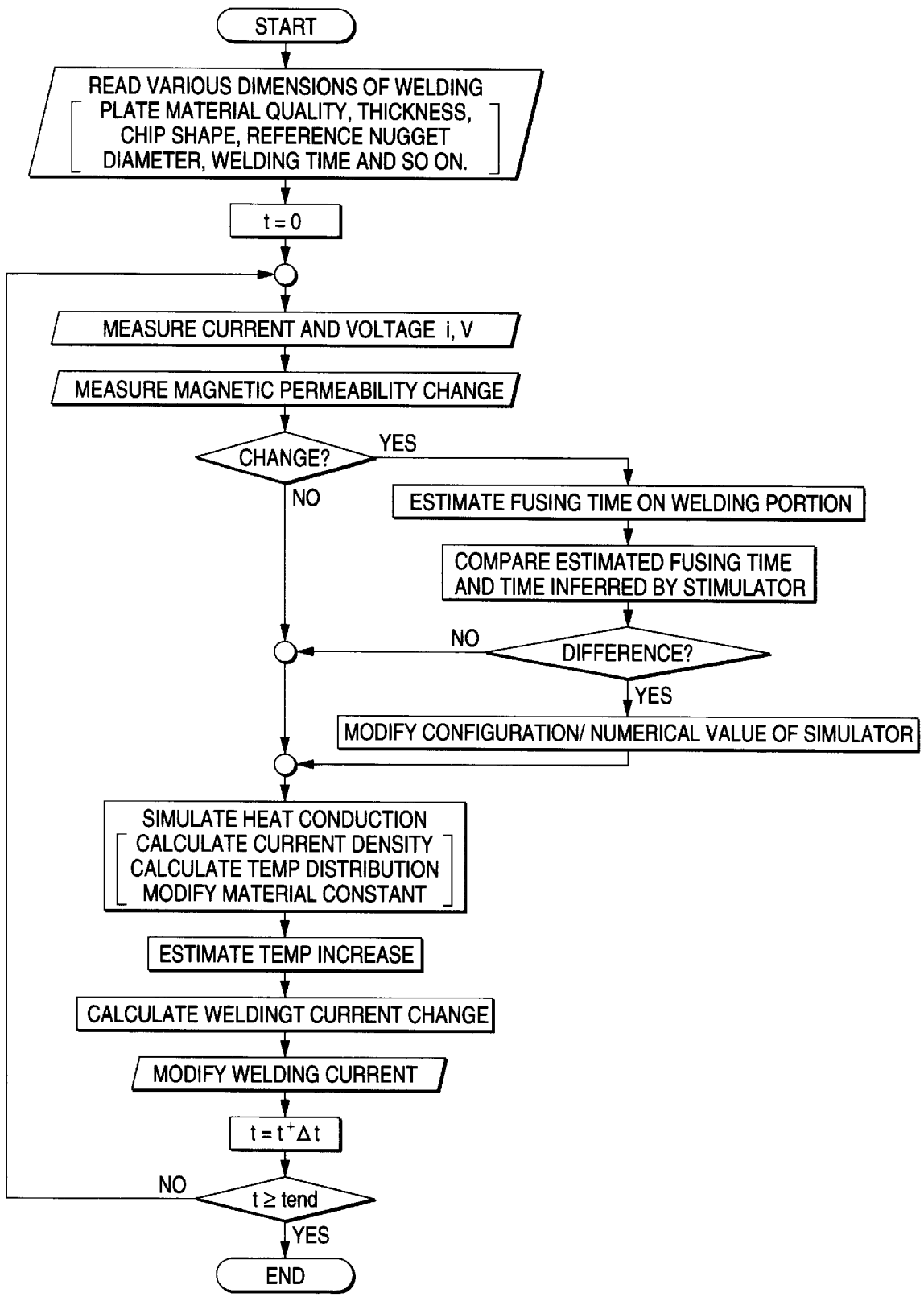
FIG. 2 is a flow chart illustrating the welding condition control method of the same resistance welder.

Next, the process of control on the welding conditions will be described with reference to the flow chart in FIG. 2.

First, welding is started after, of various factors of welding conditions, various dimensions which are not objects to be controlled, that is, the quality and thickness of the material to be welded, the shape of the electrode chip, and so on, are supplied from the condition setting portion 1. Values of a welding current, a welding voltage, and so on, which are objects to be controlled are supplied into the signal processing portion 2 continuously, and on the basis of an impedance change of the material to be welded which is obtained by dividing an instantaneous value of the welding voltage by an instantaneous value of the welding current, it is confirmed by the magnetic permeability change detection portion 3 whether the temperature of the material to be welded, which is a magnetic material, increases to be equal to or more than the magnetic transformation temperature (Curie temperature) to thereby produce a magnetic permeability change so that an inductance component is reduced suddenly or not (FIG. 2). At the same time, the measured values of the welding current and welding voltage are supplied into the heat conduction simulator 4.

Figure 4:
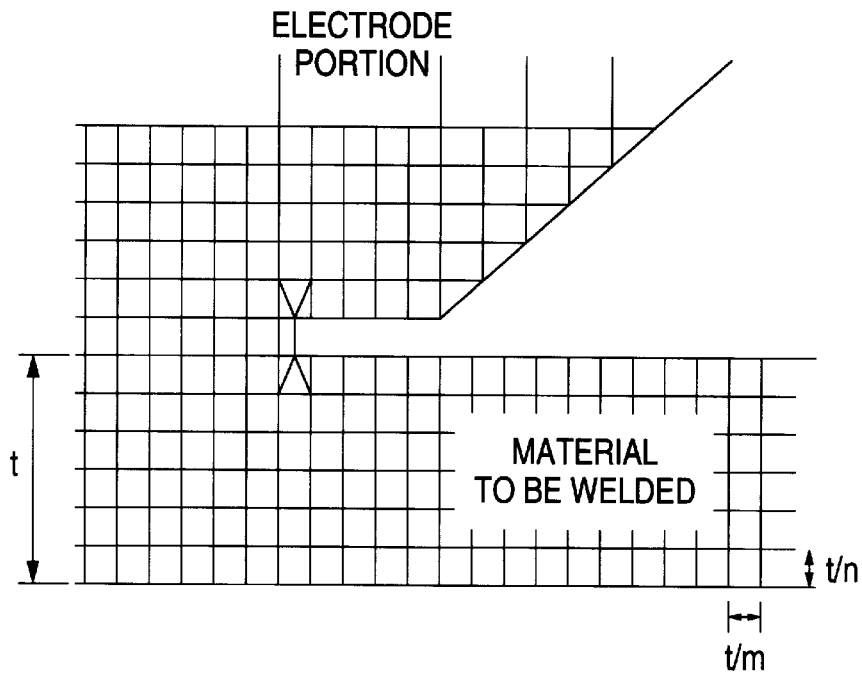
FIG. 4 is a calculation lattice diagram illustrating the configuration of a heat conduction simulator.

Now, the operation of this heat conduction simulator 4 will be described below. Numerical operation is performed upon lattices dividing the material to be welding 11 and the welding electrode 8 lengthwise and widthwise, every unit time (FIG. 4).

In a first step, material constants such as a flinging coefficient taking into consideration a specific resistance value or the way of flow of an electric current in a portion upon which a numerical operation will be performed are determined. The above-mentioned measured values of the welding current and welding voltage are input into a difference equation made up with the determined material constants so as to perform a numerical operation to thereby calculate current density and conducting diameter in every lattice.

In a second step, a temperature equation made up with material constants such as specific heat, heat conductivity and so on and the above-mentioned conducting diameter is solved to thereby calculate temperature distribution in every lattice. The area where the temperature is beyond the fusing temperature in the calculated temperature distribution is regarded as a nugget.

In a third step, an interface resistance is inserted by use of the calculated temperature distribution in every lattice (FIG. 5), or the flinging coefficient is corrected. The first to third steps are repeated until the current conduction is ended.

Figure 3:
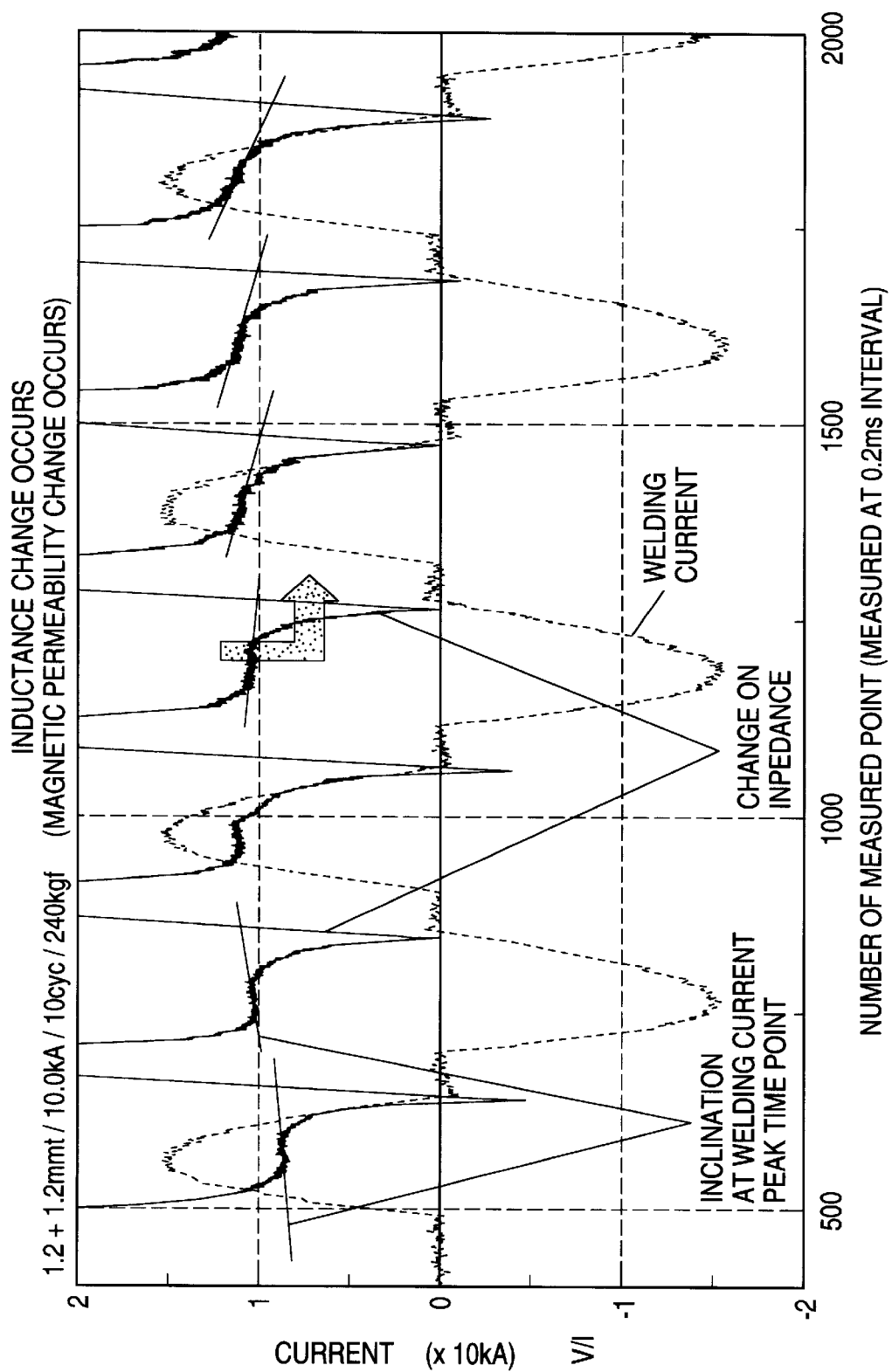
FIG. 3 is a waveform diagram showing a welding current and an impedance when a change in magnetic permeability is estimated from a change in the impedance of a nugget during welding in the resistance welder.
Figure 5:
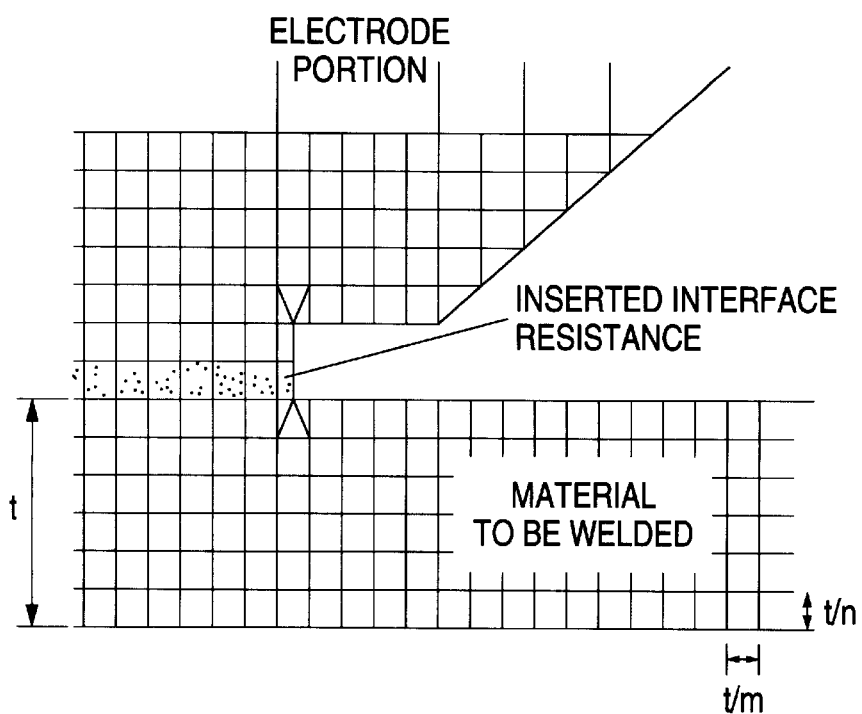
FIG. 5 is a calculation lattice diagram illustrating the state where the configuration of the heat conduction simulator is modified.
Figure 6:
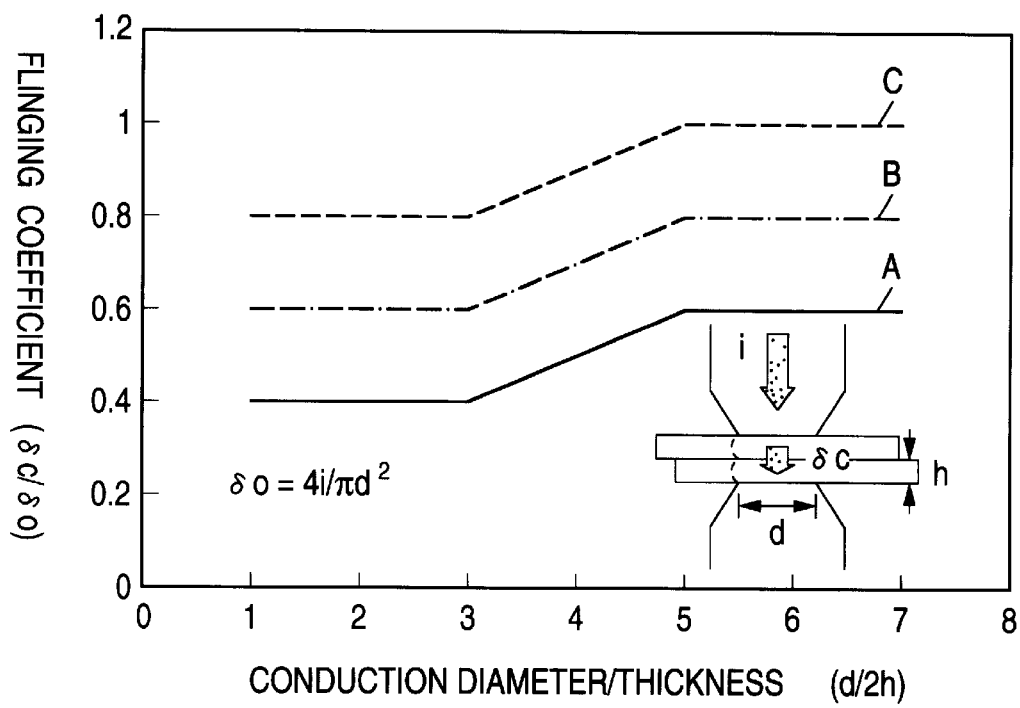
FIG. 6 is a characteristic diagram of a flinging coefficient when the flinging coefficient is changed.
Figure 7:
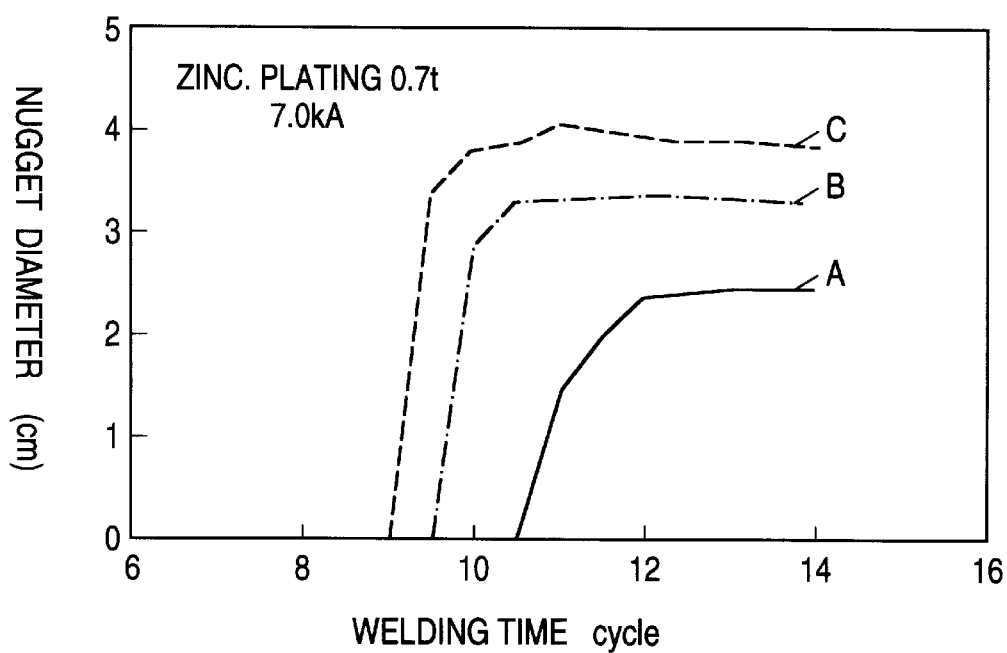
FIG. 7 is a characteristic diagram of production of a nugget estimated by the heat conduction simulator when the flinging coefficient is changed.

When a change in magnetic permeability is confirmed by the magnetic permeability change detection portion 3, the time from start of welding till generation of the change in the magnetic permeability, that is, till the center portion of the material to be welding reaches about 700° C. is found, and further the time till the material to be welded will have been fused can be estimated. FIG. 3 is a waveform diagram where a change in the magnetic permeability is estimated from a change in the impedance in a nugget portion during welding. As a result, a change in the inclination of impedance near a peak of the welding current can be detected and determined by the magnetic permeability changing time. Further, the fusing time estimated from this magnetic permeability changing time and the fusing time of the center portion estimated by the heat conduction simulator 4 are compared in the comparison portion 5. When there is no difference between the both, the configuration and the numerical value to be used by the simulator are left as it is. When there is any difference, at least one of the configuration and the numerical value to be used by the simulator is modified to make the output result of the simulator coincide with the physical phenomenon (welding phenomenon). In this embodiment, an interface resistance as a constituent which is not included in the heat conduction simulator 4 is inserted to the interface between the electrode and the material to be welded when the configuration is changed. In this case, FIG. 4 shows the basic configuration of the heat conduction simulator 4 before changed, while FIG. 5 shows the configuration of the heat conduction simulator 4 which has been changed. On the other hand, when the numerical value to be used is changed, a flinging coefficient ($\delta c/\delta o$) defining the way of flow of the welding current in the material to be welded is changed on the simulator. FIG. 7 shows values A, B and C of the flinging coefficient ($\delta c/\delta o$) to be changed and the variations of the production state of nugget diameters A, B and C estimated by the simulator as a result. Since the heat conduction simulator 4 is corrected with reference to a real welding phenomenon, it is possible to estimate the process of temperature increase of the welding portion accurately, and it is possible to control the welding conditions to produce the welding portion in a predetermined time and with a nugget having a sufficient diameter. Although the welding condition to be controlled was a welding current in this embodiment, any other welding condition, that is, at least one of electrode welding pressure and welding time may be changed.

Although at least one of the configuration and the numerical value to be used in the heat conduction simulator was changed with reference to the production state of a physical phenomenon (welding phenomenon) based on the detection of a change in magnetic permeability of the material to be welded in this embodiment, any other physical phenomenon accompanied by the welding phenomenon may be used in the same way as this embodiment. That is, the time when the welding portion in the material to be welded reaches a desired fusing diameter (nugget diameter) can be estimated from the welding pressure of the welding electrode and the quantity of movement of the electrode. In addition, if production of dust is detected during welding, it can be confirmed that the temperature of the center portion has reached the fusing temperature, or the behavior of the welding portion can be also estimated by the sound of welding generated during welding. Further, the temperature of the welding portion can be estimated from the surface temperature of the material to be welded, or the time of production of the welding portion can be estimated from the detection of a magnetic transformation point (Curie temperature) of the welding portion based on the magnetic detection of the welding portion. Further, if an ultrasonic wave is applied to the welding portion, it is possible to detect the time of production of the welding portion. In such a manner, other physical monitor values accompanied by the welding phenomenon may be used for the heat conduction simulator in the same manner.

As has been described above, according to the method of controlling welding condition of a resistance welder according to the present invention, the production state of a nugget can be monitored during welding with general-purpose properties, and the welding conditions can be changed in accordance with the monitored state so as to produce a predetermined nugget diameter accurately. Further, even if external factors are changed by wastage of a welding electrode or the like, an observable physical phenomenon is used as a monitor value expressing the welding state, and the calculation result of a heat conduction simulator monitoring the production state of a nugget in a welding portion is compared with the above-mentioned monitor value, so that by modifying the configuration of the heat conduction simulator, or correcting a numerical value to be used in the heat conduction simulator, it is possible to always use a high-accuracy heat conduction simulator. Accordingly, the invention provides a superior welding effect to obtain an accurate and high-quality resultant welding.

What is claimed is:

1. A method of controlling welding conditions of a resistance welder, comprising the steps of:

detecting a welding current and a chip-to-chip voltage;

using a heat conduction simulator for performing simulation of a welding portion on the basis of heat conduction calculation from the detected welding current and the detected chip-to-chip voltage;

estimating a status quantity expressing a nugget-forming state during welding in said welding portion;

comparing said status quantity with a reference status quantity at the time of estimation;

correcting the welding conditions on the basis of the result of comparison; and modifying at least one of a configuration of said heat conduction simulator and a numerical value of said heat conduction simulator on the basis of a monitored value expressing a state of welding after welding is started so as to make said status quantity coincide with said reference status quantity.

2. A method of controlling welding condition of a resistance welder according to claim 1, wherein the configuration of said heat conduction simulator is modified by inserting an interface resistance, and the numerical value of said heat conduction simulator is modified by changing a flinging coefficient.

3. A method of controlling welding conditions of a resistance welder according to claim 1, wherein a change of magnetic permeability of the material of said welding portion is detected after start of welding, and the time of said change of magnetic permeability is used as said monitored value expressing the state of welding.

4. A method of controlling welding conditions of a resistance welder according to claim 1, wherein at least one of welding pressure and electrode movement of a welding electrode after start of welding is detected, and the detected value is used as said monitored value expressing the state of welding.

5. A method of controlling welding conditions of a resistance welder according to claim 1, wherein generation of dust is indicative of a fusing temperature being reached, the time when dust is generated is detected after start of welding, and the detected time is used as said monitored value expressing the state of welding.

6. A method of controlling welding conditions of a resistance welder according to claim 1, wherein a welding sound generated from said welding portion after start of welding is detected, and a change of said welding sound is used as said monitored value expressing the state of welding.

7. A method of controlling welding conditions of a resistance welder according to claim 1, wherein surface temperature near said welding portion is detected after start of welding, and a change of said surface temperature is used as said monitored value expressing the state of welding.

8. A method of controlling welding conditions of a resistance welder according to claim 1, wherein a magnetic flux is radiated to said welding portion, said magnetic flux penetrating said welding portion is detected to determine whether a magnetic transformation temperature has been reached, and the time when part of or whole of said welding portion reaches the magnetic transformation temperature is used as said monitored value expressing the state of welding.

9. A method of controlling welding conditions of a resistance welder according to claim 1, wherein an ultrasonic wave is applied to the material to be welded, and the production state of said welding portion detected from the transfer characteristics of said ultrasonic wave is used as said monitored value expressing the state of welding.

10. A method for controlling welding conditions of a resistance welder by using a heat conduction simulator, said heat conduction simulator performing simulation of a welding portion on the basis of heat conduction calculation from detected values of a welding current and a chip-to-chip voltage, said method comprising the steps of:

estimating a status quantity expressing a nugget-forming state during welding in said welding portion by said heat conduction simulator;

comparing said status quantity with a reference status quantity at the time of estimation, said reference status being determined on the basis of a monitored value expressing the state of welding; and on the basis of the result of comparison, correcting the welding conditions, while modifying at least one of a configuration of said heat conduction simulator and a numerical value of said heat conduction simulator so as to make said status quantity coincide with said reference status quantity.

11. An apparatus for controlling welding conditions of a resistance welder by using a heat conduction simulator, said heat conduction simulator performing simulation of a welding portion on the basis of heat conduction calculation from detected values of a welding current and a chip-to-chip voltage, said apparatus comprising:

means for estimating a status quantity expressing a nugget-forming state during welding in said welding portion by said heat conduction simulator;

means for comparing said status quantity with a reference status quantity at the time of estimation, said reference status being determined on the basis of a monitored value expressing the state of welding;

means for correcting the welding conditions on the basis of the result of comparison; and means for modifying, during a welding operation, at least one of a configuration of said heat conduction simulator and a numerical value of said heat conduction simulator on the basis of the result of comparison so as to make said status quantity coincide with said reference status quantity.

* * * * *